Feb. 24, 1970　　H. E. STANFIELD ETAL　　3,496,901
FLOATING PUMP WITH AERATOR

Filed Aug. 13, 1968　　　　　　　　　　　　2 Sheets-Sheet 1

HOWARD E. STANFIELD
JOHN E. NEIGHBORS
GARY W. STANFIELD

INVENTORS

BY

*William S. Dorman*

ATTORNEY

Feb. 24, 1970   H. E. STANFIELD ET AL   3,496,901
FLOATING PUMP WITH AERATOR
Filed Aug. 13, 1968   2 Sheets-Sheet 2

HOWARD E. STANFIELD
JOHN E. NEIGHBORS
GARY W. STANFIELD

INVENTORS

BY

*William S. Dorman*

ATTORNEY

United States Patent Office 3,496,901
Patented Feb. 24, 1970

3,496,901
FLOATING PUMP WITH AERATOR
Howard E. Stanfield, John E. Neighbors, and Gary W. Stanfield, Tulsa, Okla., assignors to Acme Products Incorporated, a corporation of Nevada
Filed Aug. 13, 1968, Ser. No. 752,306
Int. Cl. B63h *11/10;* F04d *13/02;* C02b *9/00*
U.S. Cl. 115—12                                      3 Claims

ABSTRACT OF THE DISCLOSURE

A floating pump combined with aerator and movable over the surface of a body of water for pumping the water and dispersing it into the air whereby the oxygen content of the body of water is increased to aid in the sustaining of life of fishes and minnows, etc. Both the pump and the aerator are supported by floats. The aerator portion will include a jet discharge and a rudder. The pump will suck in water and will discharge it back through the aerator and up into the air. A portion of the discharge from the pump will be directed horizontally from the aerator as a jet stream to propel the pump and aerator combination. The adjustable rudder will permit the combined pump and aerator to be directed in a predetermined path of movement.

---

The present invention relates to a combined pump and aerator capable of floating on the surface of a body of water for increasing the oxygen content in the water.

During certain times of the year, especially during the hotter seasons, the ponds where minnows are raised and bred sometimes become devoid of oxygen. Needless to say, if there isn't a certain amount of oxygen in the water, the minnows will die. The problem of aerating bodies of water in which fishes live is recognized generally. Certain proposals have been put forth in the past for the purpose of attempting to solve this problem. However, as will hereinafter appear, it is believed that the present proposal involves a simpler and much more efficient solution to the problem than heretofore proposed or realized.

Briefly stated, the present invention includes a pumping unit and an aerating unit which are connected together by means of a hollow conduit or tube. Both the pumping unit and the aerating unit are mounted on floating supports such that the assembly is capable of floating on the surface of a body of water. The aerating unit includes a vertical discharge which will spray water received from the pump into the air. The sprayed water will pick up oxygen as it falls back towards the body of water, thereby increasing the oxygen content in the body of water. The aerating unit will also include a horizontal discharge for the purpose of propelling the entire assembly over the surface of the body of water. The aerating unit, lastly, includes a rudder which is adjustable to different positions for the purpose of guiding the combined assembly along a predetermined path of movement over the surface of the body of water.

The pumping unit includes an impeller type pump whose inlet is below the surface of the water. The discharge of this pump connects directly with the tube or conduit that extends between the pumping unit and the aerating unit. A motor, which could be a gasoline motor or an electric motor, is mounted on top of the pumping unit for driving the pump.

Therefore, it is a principal object of the present invention to provide a combined floating pump and aerator for increasing the oxygen content in a body of water upon which the combined pump and aerator is adapted to float.

It is another object of the present invention to provide a combined floating pump and aerator which is adapted to be propelled over the surface of a body of water in a predetermined path of movement.

Other and further objects and advantageous features of the present invention will hereinafter more fully appear in connection with a detailed description of the drawings in which.

Figure 1:
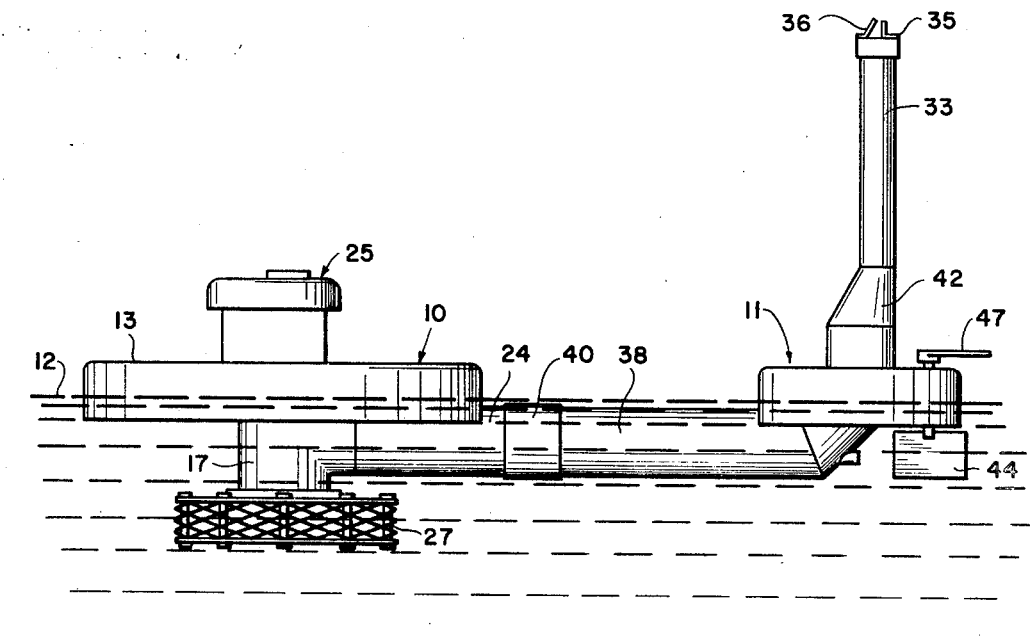
FIGURE 1 is a side elevation of the combined floating pump and aerator showing the same floating on the surface of a body of water.
Figure 2:
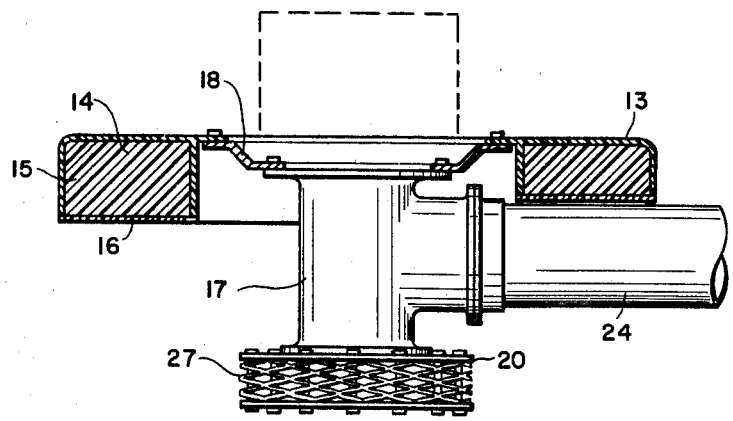
FIGURE 2 is a partial cross sectional view, with certain parts in dotted lines, of the pumping unit shown in FIGURE 1.

Referring to the drawings in detail, FIGURE 1 shows a pump unit 10 and an aerator unit 11 floating on the surface of a body of water 12. The pump unit 10 includes a floating support ring 13 which is preferably constructed of reinforced Fiberglas, metal or the like. The support ring includes a hollow annular area 14 which can be filled with Styrofoam 15 or other material which will give the support ring sufficient buoyancy to support the pumping unit in the position shown in FIGURE 1. The annular area is closed by a relatively flat plate 16 which can be bolted or otherwise secured to the float ring 13.

Figure 4:
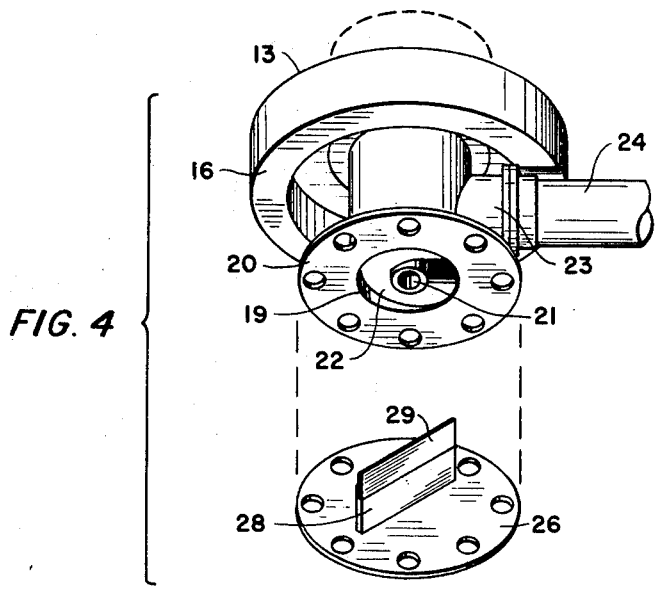
FIGURE 4 is an exploded view of the inlet for the pump.

The pump unit includes a pump 17 which is connected or bolted to the float ring 13 through an adapter ring 18 so as to be centrally disposed with respect to the support ring 13. The lower end of the pump (see now FIGURE 4) is provided with an inlet opening 19 in the center of a circular flange 20. The internal details of the pump are not shown. However, the pump does have a central shaft 21 upon which is mounted an impeller 22. The outlet 23 of the pump connects with a horizontal tube or conduit 24. The upper end of the shaft 21 connects through suitable seals (not shown) to a motor 25 which can be electrical or gasoline powered. Below the opening 19 of the pump is a flat circular plate 26 which is mounted in parallel relation with the flange 20. A cylindrical screen or grate 27 is mounted between the plate 26 and the flange 20, the latter two elements being held together by suitable bolts or the like. A vertical plate 28 is mounted on the inside of the circular plate 26 and a vertical rubber flap 29 is connected along the upper edge of the plate 28. Plates 28 and 29 extend diametrically across the opening 19 of the pump and serve to prevent cavitation.

Figure 3:
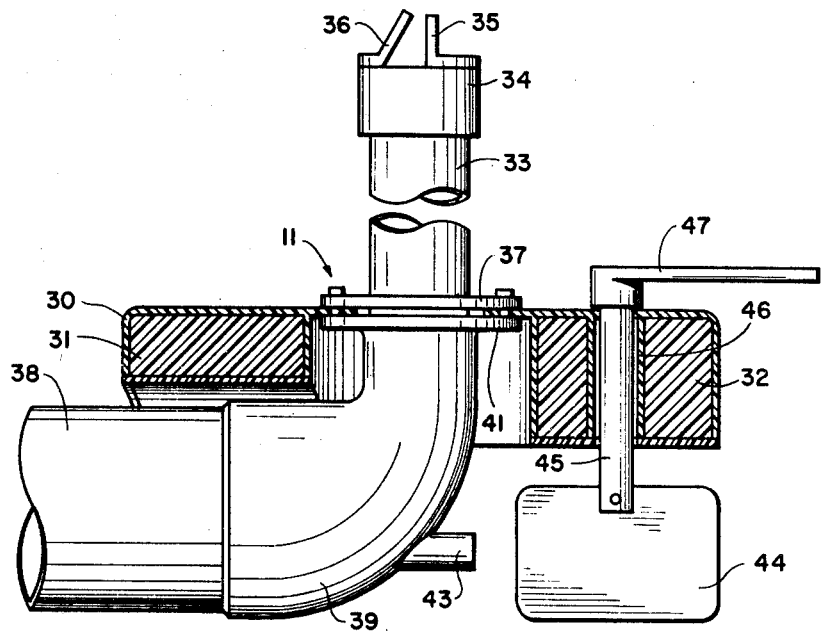
FIGURE 3 is a partial cross sectional view of the aerator unit shown in FIGURE 1.

The aerating unit 11 includes a hollow support ring 30 which, except for size, is substantially the same as the support ring 13 for the pump. This support ring 30 includes a hollow annular area 31 which is filled with Styrofoam 32 or other similar material capable of providing the required buoyancy for the aerator unit. A vertical outlet pipe 33 extends upwardly from the center of the aerator unit and terminates in an opening 34. Two plates 35 and 36 attached across the opening 34 serve to fan out the water discharge from the opening 34. The lower end of the pipe 33 is attached to the center of the support ring 30 by means of a suitable flange 37 and together with the required bolts or screws, etc. A horizontal pipe or tube 38 extends from the left to the right angle connection 39 beneath the center of the float ring 30. The conduit 38 connects with the conduit 24 by means of the coupling 40. The right angle connection 39 has an upper opening which connects with the pipe 33 and connects beneath the center of the float ring 30 by means of the flange 41. In the particular embodiment shown in FIGURE 3 the right angle connector 39 provides a reduction in the cross sectional area of the flow stream. In the embodiment shown in FIGURE 1, however, the reduction and area of the flow stream takes place in the element 42.

A short horizontal pipe 43 connects with the interior of the right angle connector 39. A rudder 44 is mounted at the lower end of a shaft 45 which extends upwardly through a suitable circular opening 46 in the float ring 30. A handle 47 is connected to the upper end of the shaft 45 and permits manual adjustment of the position of the rudder 44.

In operation, the pump unit and the aerator unit 11 float as an assembly on the surface of a body of water. When the engine 25 is turned on, the impeller 22 rotates to suck water in through the opening 19 and to discharge water from the opening 23 into the conduit 24. The water from the conduit 24 passes through the conduit 38 through the right angle connector 39 and upwardly through the vertical pipe 33. The water is discharged from the vertical pipe 33 through the opening 34 and is fanned out or otherwise defused into the air by means of the bent plates 35 and 36. A portion of the water passing into the right angle connector 39 will be forced out of the horizontal pipe 43 as a jet so as to propel the assembly in a direction towards the left (referring to FIGURE 1). By adjusting the position of the handle 47 and, hence, the rubber 44, the path of movement of the assembly can be made straight or circular.

Whereas the present invention has been described in particular relation to the drawings attached hereto, it should be understood that other and further modifications apart from those shown or suggested herein may be made within the spirit and scope of this invention. For example, various types of spray attachments could be used in conjunction with the opening 34 on the discharge pipe 33. Different types of spray patterns can be effected and, in fact, it is possible that a rotating type of spray device could be used in conjunction with the opening 34 wherein the rotation of the spray device could be effected by the water itself.

What is claimed is:

1. A combined floating pump and aerator for floating on the surface of a body of water for aerating the same comprising a pump unit having a pump mounted on a floating support, said pump having a submerged inlet and an outlet, power means mounted on said floating support for driving said pump to suck water in said pump inlet and discharge water from said pump outlet, an aerator unit including a second floating support, an upwardly extending pipe connected at its lower end to said second support and having a discharge opening at the upper end thereof, means mounted at the discharge end of said upwardly extending pipe for disposing the flow of water from said pipe, a horizontal pipe located beneath said second floating support and connecting with the lower end of said upwardly extending pipe and means connecting said horizontal pipe with the discharge of said pump.

2. The improvement as set forth in claim 1 including a second horizontal pipe of smaller diameter than said first horizontal pipe and connected thereto so as to provide a jet stream for propelling the combined pump and aerator assembly along the surface of a body of water.

3. The improvement as set forth in claim 2 including an adjustable rudder element attached to said aerator for guiding said combined pump and aerator assembly along a predetermined path of movement over the surface of said body of water.

References Cited

UNITED STATES PATENTS

| | | | |
|---|---|---|---|
| 2,825,541 | 3/1958 | Moll et al. | 239—17 |
| 3,139,060 | 6/1964 | Dane | 115—12 |
| 3,185,124 | 5/1965 | Spence | 115—12 |
| 3,235,877 | 2/1966 | Grob | 239—17 |
| 3,320,160 | 5/1967 | Welles et al. | 103—87 |
| 3,384,047 | 5/1968 | Remley | 115—12 |
| 3,393,643 | 7/1968 | Herman | 103—87 |
| 3,400,664 | 9/1968 | Kingsep | 103—87 |

HENRY F. RADUAZO, Primary Examiner

U.S. Cl. X.R.

103—87, 103; 210—14; 239—23